United States Patent
Enomoto et al.

(10) Patent No.: US 6,794,786 B2
(45) Date of Patent: Sep. 21, 2004

(54) ELECTRIC MOTOR

(75) Inventors: Yuuji Enomoto, Hitachi (JP); Yasuaki Motegi, Sano (JP); Masashi Kitamura, Mito (JP); Yuji Takagai, Kiryo (JP); Toshimi Abukawa, Hitachioota (JP); Takashi Ando, Kiryu (JP)

(73) Assignees: Hitachi, Ltd., Tokyo (JP); Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/679,409

(22) Filed: Oct. 7, 2003

(65) Prior Publication Data

US 2004/0070304 A1 Apr. 15, 2004

Related U.S. Application Data

(63) Continuation of application No. 10/083,644, filed on Feb. 27, 2002, now abandoned.

(30) Foreign Application Priority Data

Nov. 29, 2001 (JP) ........................................ 2001-364700

(51) Int. Cl.[7] .............................................. H02K 1/28
(52) U.S. Cl. ..................................... 310/218; 310/216
(58) Field of Search ................................ 310/216, 218, 310/254

(56) References Cited

U.S. PATENT DOCUMENTS

| | | | | |
|---|---|---|---|---|
| 3,914,859 A | * | 10/1975 | Pierson | 29/596 |
| 5,276,958 A | * | 1/1994 | Larsen | 29/596 |
| 6,202,286 B1 | * | 3/2001 | Schustek et al. | 29/522.1 |
| 6,226,856 B1 | * | 5/2001 | Kazama et al. | 29/596 |
| 6,515,396 B1 | * | 2/2003 | Fritzsche | 310/216 |

FOREIGN PATENT DOCUMENTS

| | | |
|---|---|---|
| JP | 07-203644 | 8/1995 |
| JP | 10-094230 | 4/1998 |
| JP | 11-252844 | 9/1999 |
| JP | 2000-152528 | 5/2000 |
| JP | 2000-184636 | 6/2000 |

* cited by examiner

*Primary Examiner*—Dang Le
*Assistant Examiner*—Nguyen Hanh
(74) *Attorney, Agent, or Firm*—Crowell & Moring LLP

(57) ABSTRACT

In an electric motor comprising a rotor, a stator, a stator core that constitutes the stator, a core section that constitutes the stator core, a plurality of split core blocks which constitute the core section, and a metallic connection housing that connects the split core blocks in dovetailed form to create one connected core section, the split core blocks are each formed of a laminated steel plate, in that the connection housing is formed of a material softer than the laminated steel plate, and the dovetailed connections at the connection housing are plastically deformed to remove the connection gap existing at each of the dovetailed connections.

8 Claims, 10 Drawing Sheets

ELECTRIC MOTOR

This application is a continuation of application Ser. No. 10/083,644, filed Feb. 27, 2002 now abandoned.

BACKGROUND OF THE INVENTION

The present invention relates to compact and high-torque electric motors, particularly to the stator cores of externally rotating type of compact-size high-torque motors such as data-processing equipment driving motors, fan motors, or disk driving motors.

With reference to the structure of the stator in an internally rotating type of motor, the predominant conventional method of improving the coil space ratio of the motor has been by, after splitting the core into segments according to the particular number of poles, laser-welding the outer surfaces of the core segments for the fastening thereof or press-fitting or shrinkage-fitting their inner surfaces into a cylindrical housing.

For the stator of the internally rotating type of motor, however, it is difficult to fasten the core segments from the outer surface portion of the stator since the stator is constructed in such a manner that its magnetic poles are arranged radially in the direction of the outer surface of the stator from the inner surface thereof and that a magnetic gap with respect to the magnet rotor of the motor is formed on the outer surface of the stator. Besides, a member such as a housing cannot be shrinkage-fit or press-fit from the outer surface portion. For these reasons, for the stator of the internally rotating type of motor, the rotor of a coil-type direct-current motor, or the like, it has been difficult to adopt a split-core method in which the core is to be split and assembled.

Prior art relating to such split core structure of an externally rotating type of motor is described in, for example, Japanese Laid-Open Patent Publication Nos. Hei 10-94230 and Hei 11-252844.

In the case of the methods set forth in these Patent Application Publications, the stator has such structure that the yoke section and tooth section of the stator core are split, that both sections are provided with dovetail-shaped recess and protrusion, and that these dovetailed portions are combined. For both methods, however, there occur the problems that since the yoke and tooth sections are fastened only by press-fitting, the mechanical strength of the corresponding product is not sufficient, and that in view of the motor undergoing the repulsion of a torque at the end of the tooth section, the corresponding method cannot be applied to a motor of a large torque.

Also, prior art relating to structure similar to the above is set forth in Japanese Laid-Open Patent Publication No. Hei 7-203644. The method described in this Patent Application Publication relates to the structure of the rotor in an internally rotating type of motor, not the structure of the stator provided with coiling, and this motor comprises magnetic pole pieces which have the dovetail-shaped holding portion for the magnet positioned inside the rotor, and a support portion made of a non-magnetized material. For this method as well, it is obviously described that the stator core is fixed only by press-fitting and that an adhesive is not used. This method also has the problem that since the magnet undergoes centrifugal force, the motor cannot be applied to high-speed rotation, or that as with the first two methods described as examples above, this method cannot be applied to high-torque motor rotation.

Yet another example is available as a method in which, as set forth in Japanese Application Patent Laid-Open Publication No. 2000-152528, a set of connected core portions are connected. In the case of this method, the ends of teeth are connected into a small width and the cores that have been connected and linearly punched out are assembled into a circular shape after coiling, wherein one end portion finally needs to be fastened using one or another method. In this example, although the use of connection pins is described as the fastening method, other methods such as welding are also available.

In this method, however, since the section between magnetic poles is connected using a magnetized material, leakage fluxes occur between the magnetic poles and the efficiency of the motor decreases significantly. In addition, since the connected section cannot have a sufficient width for mechanical reasons, the insufficiency of mechanical strength occurs and the corresponding method is not sufficient for a high-torque motor.

Furthermore, for the internally rotating type of motor set forth in Japanese Application Patent Laid-Open Publication No. 2000-184636, the yoke section of the split core is connected by shrinkage-fitting its protruding portion and recessed portion, then punched into the recessed portion, and flared outward by plastic deformation. Consequently, the gap between the protruding portion and recessed portion is removed to form a strong and rigid connection.

Connecting the split core by plastically deforming the yoke section itself affects the magnetic characteristics of the split core, thus deteriorating the performance of the motor significantly.

As described above, no such motors of the internally rotating type or externally rotating type having the structure in which a split stator core is reassembled are seen in any products or publicly known bibliography that employ the fastened core structure capable of withstanding high-torque high-speed rotation.

SUMMARY OF THE INVENTION

In the above-described prior art, although the split core structure of the externally rotating type of motor is established for a low-torque motor, the externally rotating type of motor that has split core structure is not such that the motor can be employed in an actual product in terms of mechanical strength or long-term reliability associated with high-torque rotation. However, to achieve a coil space ratio equal to that of the internally rotating type of motor, it is desirable that even for the stator core of the externally rotating type of motor, coils should be wound around a split core. For the externally rotating type of motor, therefore, it is important to assemble a split stator core while at the same time maintaining mechanical strength equal to the core that was formed by punching split stator core segments into a single unit.

Unlike an integrated core, when a split core is assembled, individual magnetic poles can be coiled independently and this enables the improvement of a coil space ratio. In the case of an integrated core, there are the problems that since coiling is provided from slot openings, it is absolutely necessary for the slot openings to have a greater width that the conductor (coil) diameter, thus that the cogging torque of the motor must be increased to satisfy the above requirement, and hence that torque is reduced. Furthermore, the low coil space ratio of such a core increases coil resistance, permitting a greater amount of heat to occur, and resulting in deteriorated heat release performance. A split core can be adopted as one of the possible methods of solving these problems. As described above, however, the adoption of a split core poses problems associated with mechanical fastening, and these problems need to be solved.

If the method adopted for the internally rotating type of motor is applied to the externally rotating type of motor, when shrinkage-fitting is considered paradoxically, the housing is likely to be located at the inner surface portion of the core, and then stressed in the direction thereof. This means that the housing is cold-shrinkage-fit, in which case, the housing to which a minus temperature difference from normal temperature has been given using liquid nitrogen or the like, is located at the inner surface portion of the core, then expands by returning to normal temperature, and stressed towards the core. With this method, however, even when the circumferentially split core is stressed in the direction of its outer surface, the stress will only spread radially and this will not enable core fastening. In addition, even when the inner surface portion is shrinkage-fit, the core itself will not be fastened since the housing will only shrink. Furthermore, shrinkage-fitting of a very thin, non-magnetized housing into the outer surface portion of the core means the spreading of a magnetic gap and deteriorates motor performance significantly.

The present invention supplies the electric motors that have a stator core formed by split core blocks in order to solve the problems described above; the fixed core having the sufficient capability to withstand the repulsion of the motor torque and not deteriorating the performance of the motor significantly.

According to the present invention, it is possible to supply a motor having a metallic connection housing which connects a plurality of split core blocks in dovetailed form to create one connected core section, wherein the motor is characterized in that the dovetailed connections at the above-mentioned connection housing are plastically deformed to remove the connection gap existing at each dovetailed connection.

In order to fulfill the above purpose, the present invention creates the structure in which the rotor core of an internally rotating type motor is split into a plurality of segments in a circumferential direction, provides each core segment with a dovetailed recess and a dovetailed protrusion at the inner surface side of the core, and further provides the housing located at the inner surface portion of the core, with the protrusion and recess that b fit into the recess and protrusion provided at the core side. The housing can be easily assembled by fitting it into a clearance, and this fitting portion has sufficient dimensions to provide the clearance required for the housing to be assembled in the fitting portion. More specifically, such dimensional relationship is established that the width of the protrusion at the housing side is smaller than the width of the recess in the fitting portion of the core, that the height of the protrusion at the housing side, of course, is also smaller than the height of the recess in the fitting portion of the core, and that the outside diameter of the housing is smaller than the inside diameter of the core. Thus, the clearance required for assembly can be obtained and the ease of assembly improves.

Provided that the above-described dimensional relationship is maintained, the gap volume of the assembling clearance is given as (Assembling clearance× Circumferential length of the fitting portion×Laminating thickness of the core). After the core and the housing have been maintained in their assembled status and the outer surface portion and laminating direction of the core have been restrained, the housing is plastically deformed from the outside of its fitting portion by use of a pressing member or a dieing tool such as a punch. In terms of volume, the amount of charging with the pressing member or die at this time is greater than the gap volume. Thus, the metal that has been charged with the die flows into the clearance between the core and the housing, and the stress required for further flow of the remainder is left as the internal residual stress of the metal. Since both the outer surface portion and laminating direction of the core are maintained in their restrained status as mentioned above, fastening between core segments and between the housing and the core is established by the residual stress applied between the housing and the core. At this time, since the mechanical gaps between adjacent core segments are eliminated, magnetic connection is established and improved motor characteristics are anticipated.

Furthermore, the laminating direction of the core can also be fixed at the same time according to the particular manner of giving plastic deformation, in other words, the shape of the dieing tool, such as punch, that is to be inserted. That is to say, the laminating direction of the core can be fixed by giving a stepped shape to the punch to be inserted into the fitting portion and spreading the edge of the housing.

The fact that above-mentioned fastening is possible means that the assembly structure of the split core can be established and that the shape of the core increases in the degree of freedom. The diameter of the slot openings described earlier in this document can be reduced, regardless of the conductor coiling diameter, and the coil space ratio can also be improved. Also, since the space ratio can be improved, coil resistance can be reduced, and in addition, since the thermal conductivity between conductors improves, the temperature characteristics of the motor can be improved. Hence, critical motor designing becomes possible and this, in turn, enables size reduction and the improvement of efficiency. At this time, since the magnetic flux density created by the coils improves, there also arise the disadvantages that magnetic saturation occurs at the ends of the teeth and that the rotor magnet becomes demagnetized. The high degree of freedom in the design of the core shape, however, enables the improvement of disadvantages not brought about by the prior art.

DESCRIPTION OF THE PREFERRED EMBODIMENTS

Figure 1A:
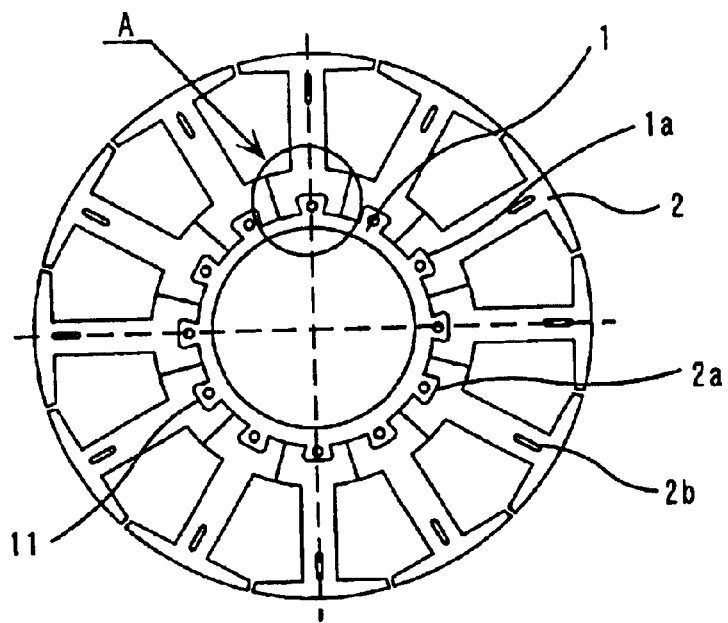
FIG. 1 shows one of the embodiments pertaining to the present invention and consists of a front view showing the stator core of an externally rotating type motor, and a partly enlarged view of this front view.

The preferred modes of embodiment of the present invention are described below using drawings.

Although the present invention relates to motors of the externally rotating type and the internally rotating type, since the major motors shown in the drawings are of the externally rotating type, motors of the internally rotating type are mainly described below.

Figure 1B:
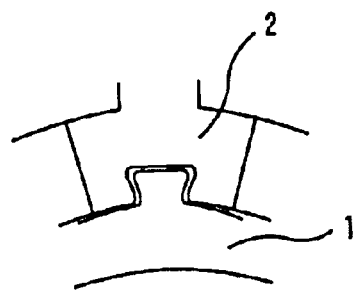
Figure 1C:
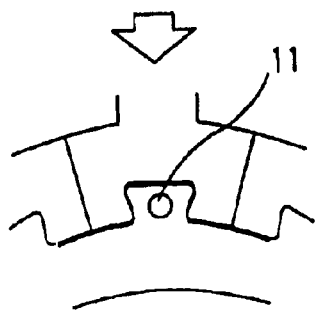

FIG. 1 shows the stator core structure of an externally rotating type motor, wherein (a) is a front view of the stator core. Likewise, (b) is an enlarged view of (a), showing the status existing before plastic deformation using a punch takes place, and (c) is another enlarged view of (a), showing the status existing after plastic deformation using a punch has taken place.

The core section of the rotor core is formed by combining a plurality of split core blocks 2 (magnetic pole tooth sections or teeth) into a single unit. Each magnetic pole tooth section 2 further comprises a coil winding drum portion, an outer-surface magnetic pole portion provided at the outer-surface front end of the coil winding drum and spread in a circumferential direction, and a support portion provided at the inner-surface front end of the coil winding drum.

Split magnetic pole tooth sections 2 are arranged in such a manner that the respective outer-surface magnetic pole portions are positioned at the outer-surface side and that the coil winding drum is radially positioned. The above-mentioned magnetic pole tooth sections that have thus been arranged are connected into a single unit so that they are connected to connection housing 1 positioned at the inner-surface side of the support portion mentioned above. The stator core is formed by the core section which is further formed by radially arranged magnetic pole tooth sections 2, and connection housing 1 by which the magnetic pole tooth sections 2 forming the core section are connected into a single unit. Connection housing 1 uses a metallic material softer than the metal of the core section.

Magnetic pole tooth sections 2 and connection housing 1 are connected in dovetail form. An engagement recess 2*a* for dovetailed connection is provided on the inner surface of the support portion of each magnetic pole tooth section 2, and an engagement protrusion 1*a* for dovetailed connection is provided on the outer surface of connection housing 1 so as to protrude to the outer surface side thereof.

The engagement recess and the engagement protrusion can also be provided in connection housing 1 and at magnetic pole tooth section 2, respectively. However, description is continued below in accordance with the structure of the embodiments shown in the drawings.

When engagement protrusion 1*a* provided on the outer surface of connection housing 1 is inserted into engagement recess 2*a* provided on the inner surface of the support portion of each magnetic pole tooth section 2, the magnetic pole tooth section will be connected to the connection housing and individual magnetic pole tooth sections 2 will be connected into unity via connection housing 1.

In this way, split multiple magnetic pole tooth sections 2 are assembled as one core section, and to provide the ease of the assembly, engagement protrusion 1*a* is so constructed as to loosely fit into engagement recess 2*a*.

That is to say, the creation of the loose fit permits easy insertion of engagement protrusion 1*a* into engagement recess 2*a*, and hence, very easy assembly, and improves assembly efficiency. These can be achieved by making the width and height of engagement protrusion 1*a* smaller than those of engagement recess 2*a*.

Since the above-mentioned dimensional relationship is established, a connection gap exists between engagement protrusion 1*a* and engagement recess 2*a*, as shown in FIG. 1(*b*). When, as shown in FIG. 1(*c*), a machining hole 11 for plastic deforming is formed at engagement protrusion 1*a* by inserting a dieing tool such as a punch, engagement protrusion 1*a* will be pushed outward and the connection gap will be consequently filled in and removed. Once the connection gap has thus been removed, the dovetailed connection by the fitting of engagement protrusion 1*a* into engagement recess 2*a* can be rigidly fastened without looseness.

If an engagement recess is provided in connection housing 1 and an engagement protrusion is provided at each magnetic pole tooth section 2, fastening can be accomplished by inserting a dieing tool or punch into the outer vicinity of the engagement recess. With either method, the dovetailed connection at the connection housing side can be fastened by plastically deforming this connection.

Figure 2A:
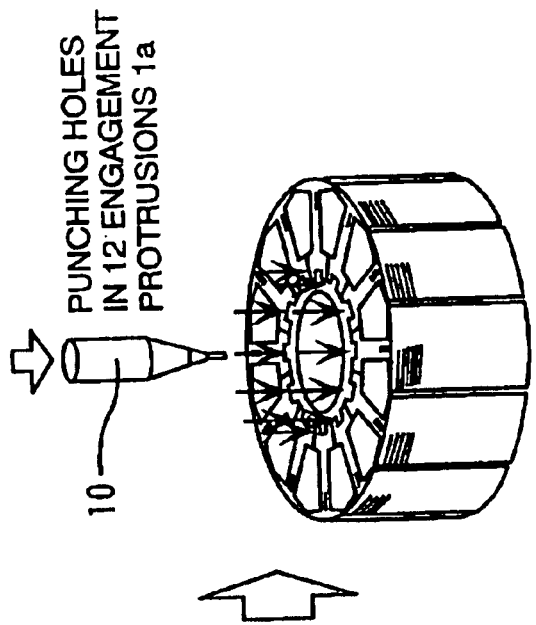
FIG. 2 shows another embodiment of the present invention and consists of an assembly diagram showing the insertion of a connection housing into a stator core, and a view that shows related punching.
Figure 2B:
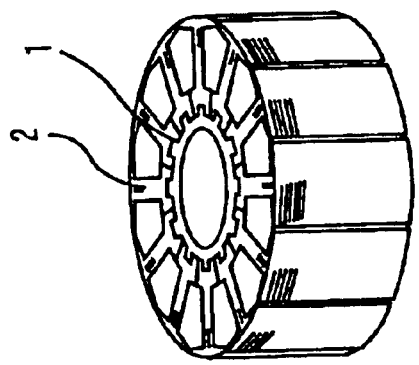
Figure 2C:
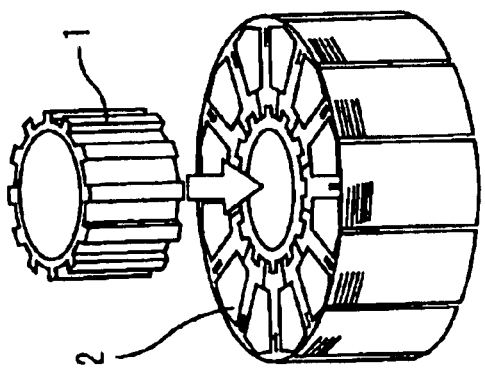

The assembly of the stator core section and connection housing of an externally rotating type motor is described in the alphabetical order shown in FIG. 2.

FIG. 2 is an oblique view showing the assembly process. As shown in FIG. 2(*a*), connection housing 1 is inserted along the laminating thickness of the core section, that is, in the lateral laminating direction thereof. Since engagement recesses and engagement protrusions are already formed in that direction, connection housing 1 can be easily assembled along the inner edge of the core section. When connection housing 1 is inserted, the magnetic pole teeth 2 (split core blocks) that constitute the core section will be lightly positioned as shown in FIG. 2(*b*).

Under the above status, such punch 10 as shown in FIG. 2(*c*) is inserted as a dieing tool into each engagement protrusion 1*a* on connection housing 1 (including the dovetailed connection or the vicinity of the portion which fits into the corresponding engagement recess), and such position as shown in FIG. 1(*c*) is provided with hole-like plastic deformation.

Hereby, the metallic material (aluminum) of connection housing 1 that has been extruded by the punch flows into the connection clearance (connection gap) that has existed at up to that time, and the material that has been extruded more strongly creates a residual stress inside the connection housing to implement fastening between magnetic pole teeth 2 (split core blocks) and between magnetic pole teeth 2 and the connection housing. Consequently, rigid and looseness-free dovetailed connection is established.

In this embodiment, the connection housing is made of a soft metallic material (aluminum). It is desirable that the connection housing material be relatively small in tensile strength and in yield strength, and for example, an aluminum alloy, a zinc alloy, a copper alloy, magnesium, or the like is likely to be suitable, but other materials are also usable. It suffices just to use a material softer than the material forming the magnetic pole teeth.

Next, processes from the formation of split core blocks and the winding of coils to the assembly of the stator are described below in the alphabetical order shown in FIG. 3.

Figure 3A:
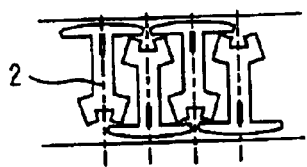
FIG. 3 shows yet another embodiment of the present invention and is a diagram showing a series of processes from the punching of a stator core to assembly and coil winding.
Figure 3B:
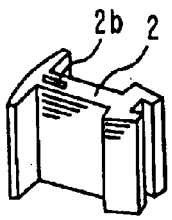

First, a core is formed by, as shown in FIG. 3(a), punching out magnetic pole teeth 2 from an unprocessed motor core material such as a silica steel plate, and the magnetic pole teeth are laminated as shown in FIG. 3(b). These magnetic pole teeth are then fixed so that they do not disperse. In general, the plate members of the magnetic pole teeth laminated are so fixed using a staking member 2b as to be connected to each other. Or the magnetic pole teeth may be fixed by welding the outer-surface and/or inner-surface edges of magnetic pole teeth 2 by means of a laser or the like.

Split punching of individual magnetic pole teeth 2 can be implemented at a higher yield ratio than the punching of an integrated magnetic pole tooth section, for the quantity of residual material wasted will be smaller and the punching yield ratio will improve.

According to the theoretical values for the motor in this embodiment, the punching yield obtained from punching an integrated magnetic pole tooth section is about 30%, whereas the punching yield obtained from punching split magnetic pole teeth is about 60%, which is about twice the above value.

Figure 3C:
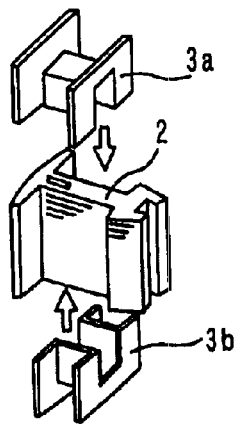

Next, an insulating bobbin of the shape shown in FIG. 3(c) is installed to ensure the adequate insulation between magnetic pole tooth section 2 and the coils to be wound. This bobbin is usually made of a resin material such as nylon, PBT, PET, PPS, or LCP.

Instead, it is also possible to wind tape-like electrical insulating paper or to cut similar paper into small pieces and attach them.

Or above-mentioned insulation can likewise be implemented by using an insert molding made up of resin and a core or coating the core with epoxy resin or the like. Since magnetic pole tooth section 2 is created in split form, outside is provided with coiling and any of the methods described above can be freely selected for processing.

Figure 3D:
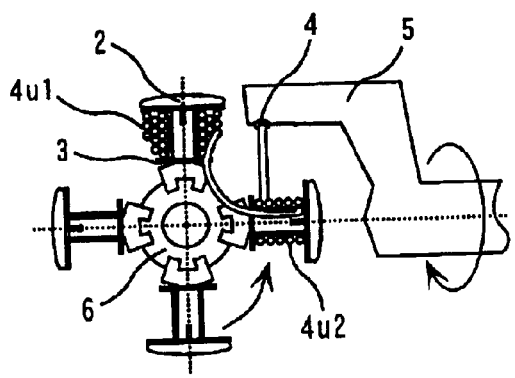

Insulated magnetic pole tooth section 2 is then set in a coil winding machine as shown in FIG. 3(d), and coils are wound around the coil winding drum of magnetic pole tooth section 2. In this example, each magnetic pole tooth section 2 is supported by setting the engagement recess of the support portion of the magnetic pole tooth section at the core holding portion 6 of the coil winding machine. Magnetic pole teeth 2 is set in cross form and then aligned coiling is provided so that a wide working space can be created at the flyer arm 5 of the coil winding machine. Thus, during coil winding around the coil winding drum of magnetic pole tooth section 2, it is possible to achieve a high coil space ratio at which the quantity of conductors loading with respect to the slot area of the magnetic pole tooth section can be increased to a maximum.

Figure 3E:
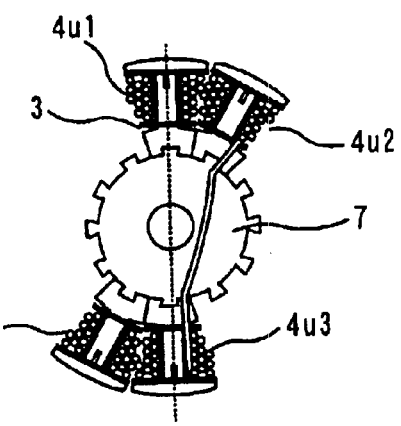
Figure 3F:
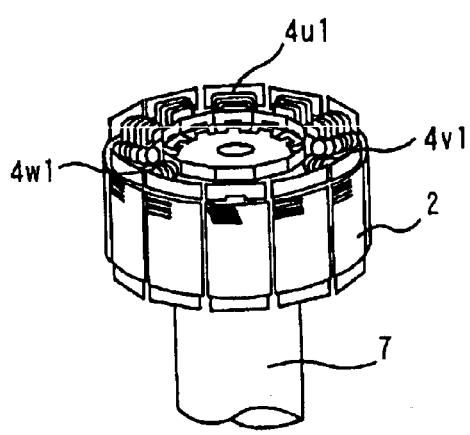
Figure 3G:
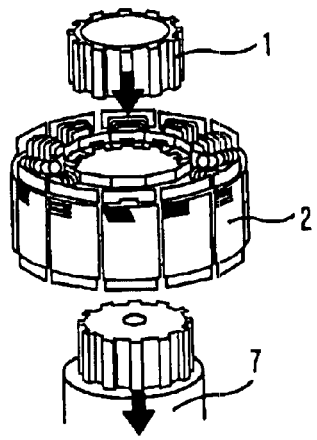

Next, the process for setting coiled magnetic pole tooth section 2 on an assembly jig is shown in FIG. 3(e). For three phase of coiling in a 12-slot motor, four coils are wound for one phase. Magnetic pole teeth 2 on which these coils (4u1, 4u2, 4u3, 4u4, 4v1, 4w1) have been mounted are set on assembly jig 7 so that the teeth are arranged according to the particular number of poles of the motor. Although the arrangement shown in FIG. 3(e) applies to a 10-pole motor, this arrangement can also be applied to other motors such as an 8-pole motor, depending on the way the magnetic pole teeth are to be arranged. In this case, the engagement recesses of magnetic pole teeth 2 are also supported in a similar way to that of supporting on the coil winding machine. The status that the magnetic pole tooth section 2 provided with three phases of coiling is supported using assembly jig 7 is shown in FIG. 3(f). After the magnetic pole tooth section has thus been supported, connection housing 1 is inserted and on completion of the insertion, the assembly jig is removed. This state is shown in FIG. 3(g). After removal of the jig, assembly is started.

Figure 4A:
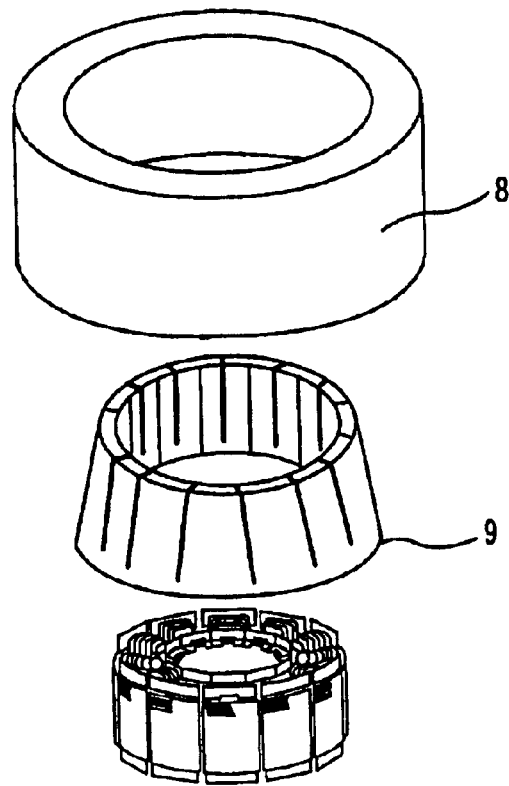
FIG. 4 shows a further embodiment of the present invention and is a view showing the adjustment of the roundness of a stator core using a collet holder and a collet chuck.
Figure 4B:
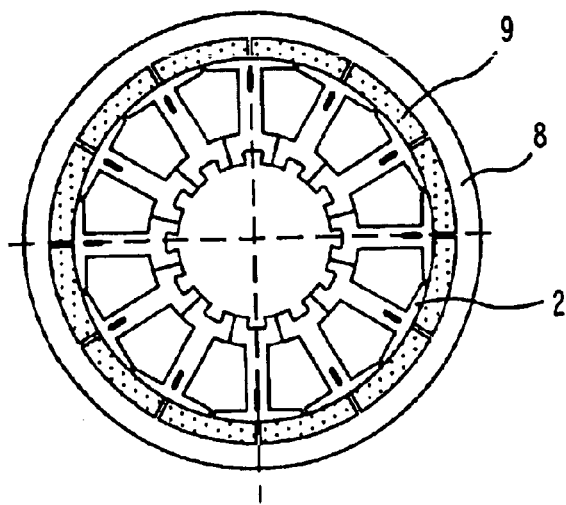

Next, the improvement of the stator core in terms of roundness and position accuracy is described using FIG. 4.

At the phase of FIG. 3 showing the status that coiled magnetic pole tooth section 2 has been moved from assembly jig 7 to connection housing 1 for the purpose of its insertion, the stator core is not sufficient in terms of roundness and position accuracy. At the magnetic pole teeth 2 to be connected into a single unit via connection housing 1, a connection gap exists between engagement recess 2a and engagement protrusion 1a, and adjacent gaps also exist between the support portions of adjacent magnetic pole teeth, with the result that the position of magnetic pole tooth section 2 is not fixed and the stator core is not sufficient in terms of roundness and position accuracy.

After the connection housing has been inserted as shown in FIGS. 4(a) and (b), the outer surface portion of the stator core is restrained using a tapered collet chuck 9. A collect chuck holder 8 whose inner surface portion has a taper of the same angle as that of the taper of the collet chuck 9, is applied over the outside of the collet chuck. After this, collet chuck holder 8 is inserted as shown in FIG. 4 (a), and as a result, the stator core is restrained in its radial direction, that is to say, pressed towards the center, by collet chuck 9 at the same time the stator core is contracted.

In other words, equal stresses are applied in an inner surface direction by applying the collet chuck holder and pressing the collet chuck towards the center, and hereby, plastic deformation is applied to the connection housing while it is being restrained with high accuracy. Thus, an error in the roundness of the stator core outside diameter and an error in the dimensional accuracy of the stator core in terms of position accuracy are compensated for properly, and under this state, assembly can be conducted.

Although the stator core with the inserted connection housing has been described above, roundness can likewise be adjusted using the collet chuck holder before the connection housing is inserted.

Next, the compensation for errors in the roundness of the stator core and in its dimensional accuracy in terms of position accuracy are described in further detail below with added reference to the dimensions of the connection gap and adjacent gaps.

The connection gap existing at the dovetailed connection between engagement recess 2a and engagement protrusion 1a has a width of W1 in the case of connection gap "g1" or a width of W2 in the case of connection gap "g2". Adjacent gaps "gk" are present between adjoining support portions. This state exists before the stator core is pressed by the collet chuck holder.

The entire stator core is pressed in the direction of the center by the collet chuck holder, then both ends of each adjacent support portion are connected to remove adjacent gaps "gk", and the roundness of the stator core is adjusted with high accuracy. Both adjacent gaps "gk" are cleared to zero ("gk1", "gk2") as shown in FIG. 5(b).

Under the adjusted status of roundness, connection gap "g2" still exists. Although connection gap "g1" is narrowed, its size has been increased beforehand for a portion of the gap to remain. Thus, the assembly procedure for inserting the connection housing can be taken after the roundness of the stator core has been accurately adjusted using the collet chuck holder.

Figure 5A:
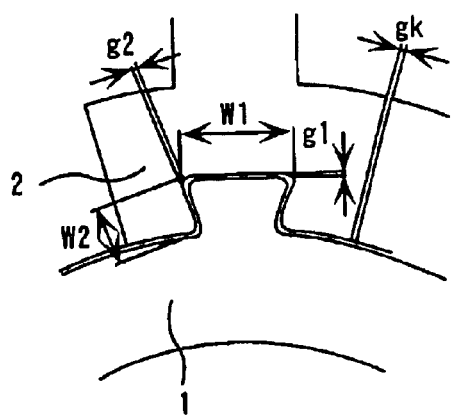
FIG. 5 shows a further embodiment of the present invention and is a view showing the fastening of a dovetailed connection by insertion with a punch.
Figure 5B:
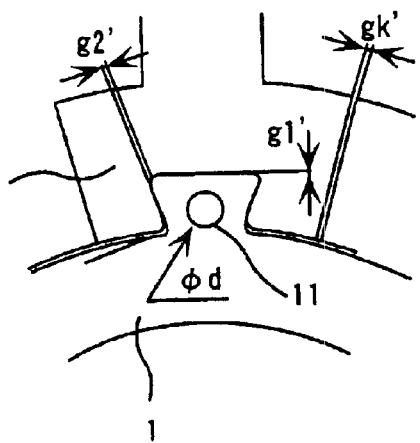

While, as described above, in the accurately adjusted roundness of the stator core is being maintained using the collet chuck holder, a machining hole 11 for plastic deforming with a punch 10 is formed at each engagement protrusion 1a as shown in FIG. 5(b), and the material that has been extruded around the hole 11 by the formation thereof fills in connection gaps "g1" and "g2" to clear both to zero ("g1" and "g2", respectively). Thus, the corresponding dovetailed connection can be fastened rigidly without looseness.

Figure 5C:
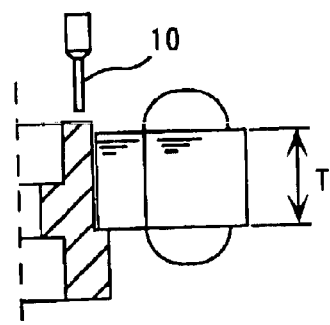
Figure 5D:
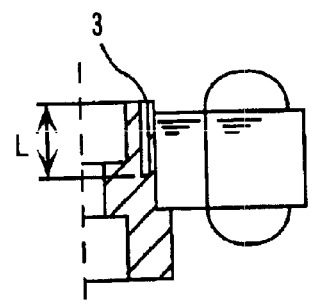

FIG. 5(c) shows the shape existing before punching. FIG. 5(d) shows the shape existing after punching.

The total space volume of the above-mentioned connection gaps "g1" and "g2" can be expressed as follows:

$$D1=(W2\times g2+2\times W1\times g1)\times T \quad (1)$$

If the diameter of the punch to be inserted into the periphery of the fitting portion of the housing is taken as "φd", the volume of the material extruded by the insertion of the punch can be calculated as follows:

$$D2=L\times \pi \times d\times d/4 \quad (2)$$

At this time, assume that the relationship between D1 and D2 in the above two expressions is maintained as follows:

$$D1<D2 \quad (3)$$

That is to say, since the quantity of material extruded is greater than the space volume required for connection gaps "g1" and "g2" to be filled in, the remainder of the stresses which have been released from the material by spring-back is left as a residual stress, which then presses adjacent magnetic pole teeth 2 against each other to fasten rigidly the dovetailed connections between magnetic pole tooth section 2 and the connection housing.

Since the stator core can be assembled into highly accurate roundness, both adjacent gaps "gk" are cleared to zero ("gk1", "gk2") and both ends of each adjacent support portion are connected. Since this connection spans over the entire length in a radial direction, magnetic characteristics similar to those of a stator core which is formed into a single unit are maintained and the motor does not decrease in characteristics.

As shown in the cross-sectional view of FIG. 5(b), the laminating thickness (laminating direction) of the stator core can also be fixed by generating plastic deformation in the laminating direction. That is to say, as shown in the figure, the lower end is supported by the stepped section of the connection housing and the upper end is held by the plastically deformed section, with the result that the magnetic pole teeth constituting the stator core are held vertically in sandwiched form.

Figure 6C:
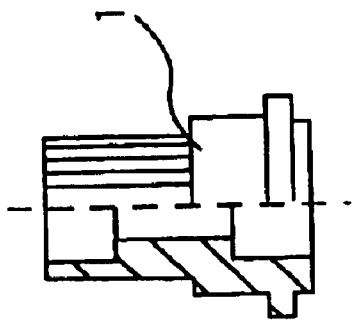
FIG. 6 shows a further embodiment of the present invention and consists of the views that show connection housings of various shapes.
Figure 6B:
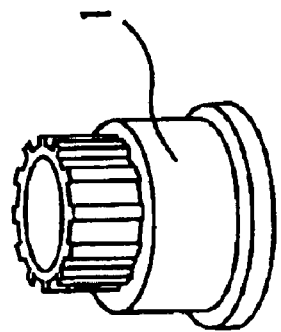

FIG. 6 is an explanatory view showing the shapes that the connection housing can take.

Figure 6A:
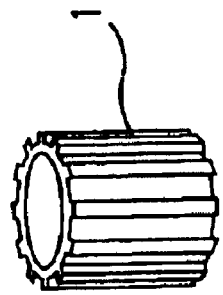

Among the shapes that the connection housing can take is a housing shape having the same cross section in the direction of lamination (axial direction), as shown, in FIG. 6(a). Since this shape has the same cross section, the housing, if made of aluminum, copper, or the like, can be manufactured using a method such as cold forging, cold-draw molding, hot drawing, extruding, or die-casting. Also, a connection housing, such as that shown in FIG. 6(b), that has the structure consisting of a combination of a cylinder and a cross-sectional shape having the portion fitting into the stator core, or a connection housing, such as that shown in FIG. 6(c), that has a different diameter at its inside diameter section as well, is applied to an actual motor. These housings can be manufactured by cold forging.

Figure 7A:
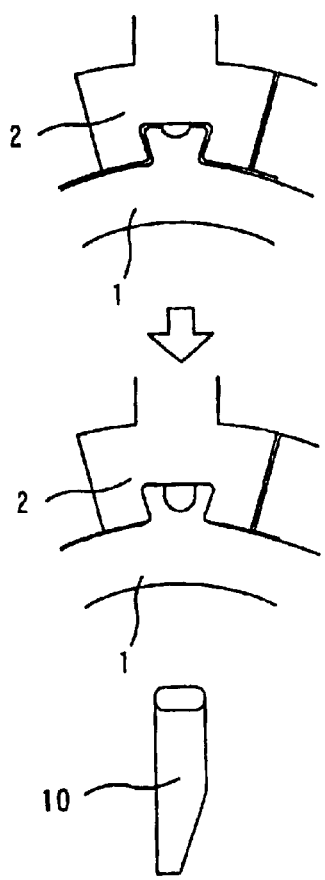
FIG. 7 consists of the views that show punches of various shapes and also show fastening by insertion with each punch.
Figure 7B:
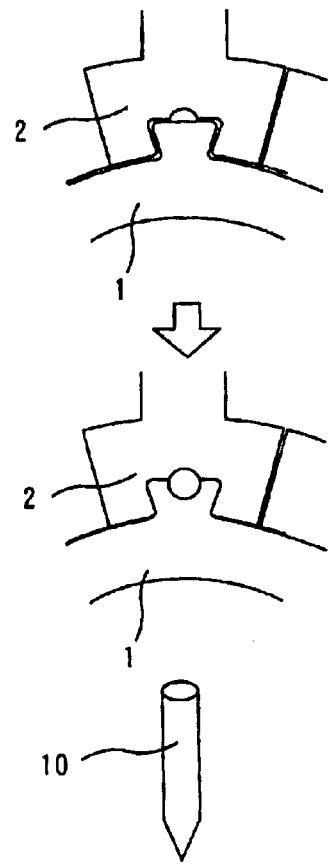
Figure 7C:
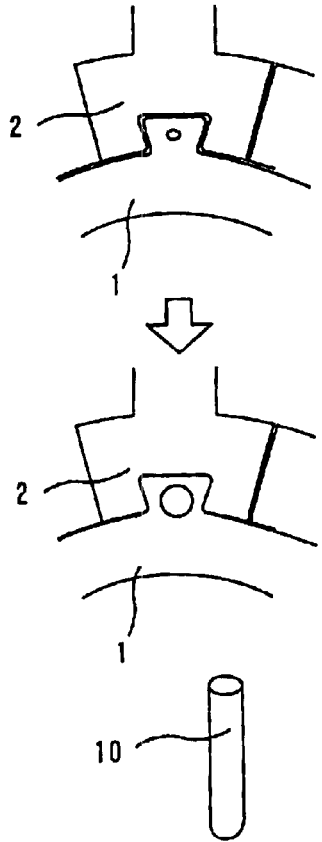

FIG. 7 shows the shapes of dovetailed connections. FIG. 8 shows the shapes of plastic deforming punches. FIG. 7(a) shows the shape of a connection housing provided with a semi-circular notch, in which case, a plastic deforming punch 10 having a tapered end is inserted into the notch and thus elliptical plastic deformation is generated to fasten the stator core. Another shape can be created by, as shown in FIG. 7(b), providing the stator core beforehand with a notch of a semi-circular shape or the like and then inserting a punch whose end is tapered and whose cross-sectional shape is circular. With this method as well, since a material such as aluminum is plastically deformed along the notch in the stator core, the resulting flow of the material of the semi-circular section enables fastening. For the shape of FIG. 7(c) as well, fastening can likewise be achieved by providing the connection housing with a positioning mark such as a punched hole and then providing cylindrical hole plastic machining by use of a punch having a spherical end.

FIG. 8 shows an example in which the fastening of the plastically deformed stator cores pertaining to the present invention is to be applied to motors of the internally rotating type.

Figure 8A:
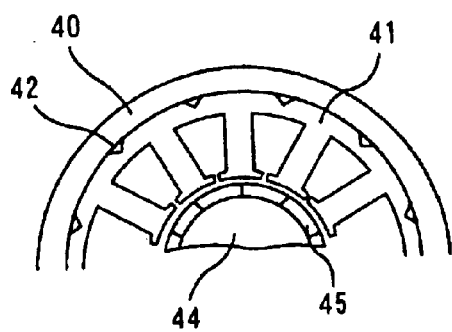
FIG. 8 shows a further embodiment of the present invention and is a view showing a motor of the internally rotating type.
Figure 8A:

The internally rotating type motors shown in FIGS. 8(a) and (c) have a connection housing 40 inserted along the outer surface of a stator core 41. The connection housing 40 is made of a steel plate softer than an aluminum or silica steel plate.

Assembly can be simplified by giving to connection housing 40 an inside diameter slightly greater than the outside diameter of the stator core 41. After assembly, the sections of connection housing 40 that are close to the notches 42 provided along the outer surface of stator core 41 are provided with holes 43 by punching, as shown in FIG. 8(c). Hereby, the forming material of connection housing 40 plastically deforms and fits into notches 42, and consequently, connection housing 40 is securely fixed to the outer surface of stator core 41.

The inside of stator core 41 is equipped with a rotor yoke 44 and a rotor magnet 45.

Figure 8B:
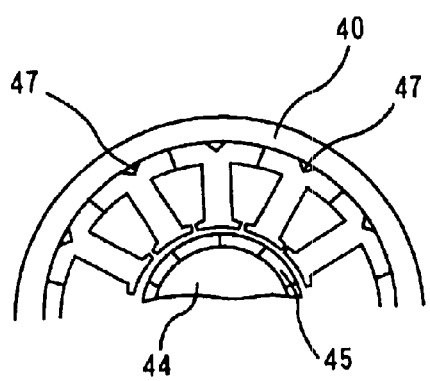
Figure 8B:
Figure 8C:
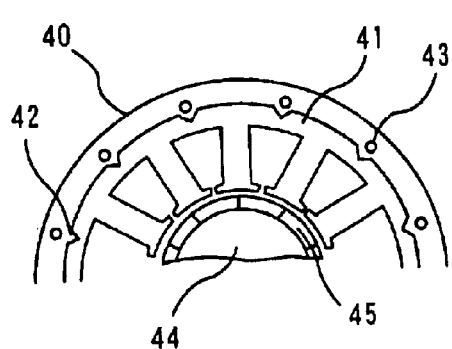

The internally rotating type motors shown in FIGS. 8(b) and (d) have a connection housing 40 inserted along the outer surface of the stator core which has been formed by combining a plurality of split magnetic pole teeth 46. The connection housing 40 is made of a steel plate softer than an aluminum or silica steel plate.

Figure 8D:
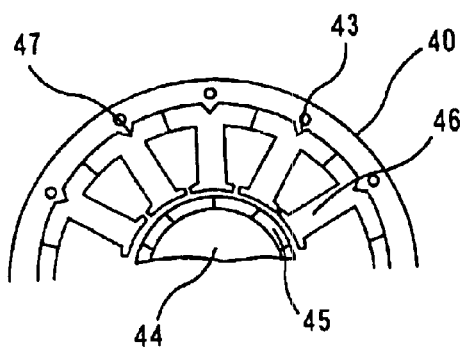

Assembly can be simplified by giving to connection housing 40 an inside diameter slightly greater than the outside diameter of the stator core 41. After assembly, the sections of connection housing 40 that are close to the notches 47 provided along the outer surface of magnetic pole teeth 46 are provided with holes 43 by punching, as shown in FIG. 8(d). Hereby, the forming material of connection housing 40 plastically deforms and fits into notches 47, and consequently, connection housing 40 and magnetic pole teeth 46 are securely fixed and the plurality of magnetic pole teeth 46 are rigidly connected into a single unit.

Figure 9A:
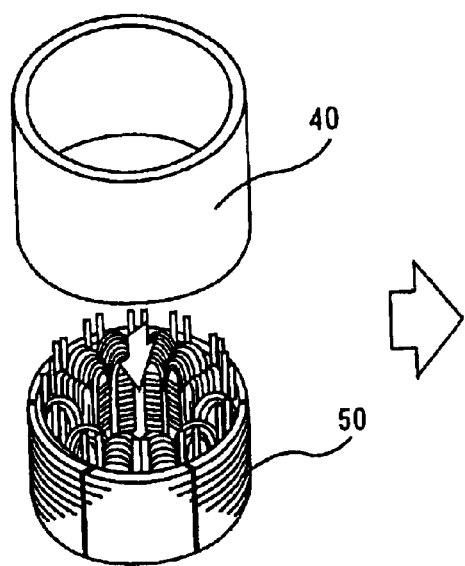
FIG. 9 shows a further embodiment of the present invention and is a view showing another motor of the internally rotating type.
Figure 9B:
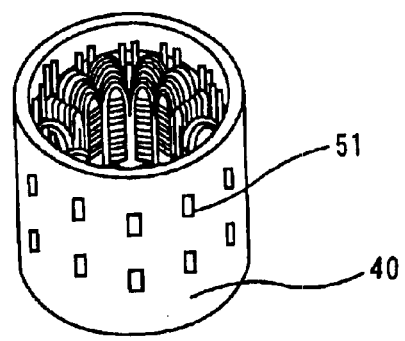

FIG. 9 shows another method of fastening an internally rotating type motor by plastic deforming.

The connection housing 40 of the internally rotating type motor has an open outer surface. Connection housing 40 is inserted along the outer surface of stator core 50 as shown in FIG. 9(a).

Connection housing 40 is made of a steel plate softer than an aluminum or silica steel plate.

Assembly can be simplified by giving to connection housing 40 an inside diameter slightly greater than the outside diameter of the stator core 50.

After assembly, when a plastic deforming die such as a punch is inserted directly from the outer surface of connection housing 40 in the direction of its inner surface, the plastic deformation will allow the forming material of connection housing 40 to flow into the groove of the stator core 50 and the clearance between stator core 50 and connection housing 40, with the result that the fastening of the split stator core segments 50 and the fastening of the stator core and the connection housing will be implemented. The holes 51 that have been created by the plastic deformation will be formed on the surface of connection housing 40.

Figure 10:
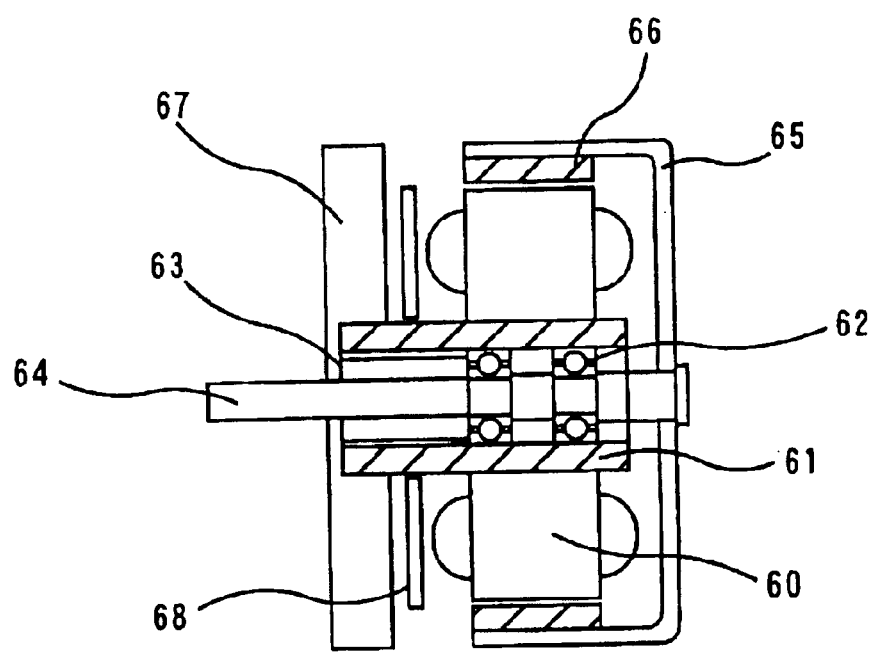
FIG. 10 shows a further embodiment of the present invention and is a total view showing an externally rotating type motor based on the present invention.

FIG. 10 shows the total structure of an externally rotating type motor.

Stator core 60 is equipped with a connection housing 61 on its inner surface. Stator core 60 is fastened by the plastic deformation of the connection housing 61. The inner surface of the connection housing 61 is equipped with bearings 62 and a collar 63. A rotating shaft 64 is supported on bearings 62 so as to be freely rotatable, and a rotor core 65 is supported at one end of the rotating shaft 64. Rotor core 65 has the shape of a cup, and magnets 66 are provided at the inner surface portions of the rotor core that face the outer surface portions of the stator core. Magnets 66 are installed using an adhesive or the like. Connection housing 61 is fixed to the base portion 67 of the motor. A control circuit board 68 is equipped between base portion 67 and stator core 60. The base portion 67 of the motor and the connection housing 61 are fixedly connected by press-fitting, screwing, shrinkage fitting, welding, or the like.

The application of the above-described present invention to an externally rotating type motor of such structure enables an inexpensive, compact, high-torque, and low-cogging-torque motor to be obtained.

The above-described major features and related characteristics of the present invention are summarized below.

(1) The magnetic pole tooth section formed by each of said split core blocks is characterized in that this tooth section comprises a coil winding drum portion, an outer-surface magnetic pole portion provided at the outer-surface front end of said coil winding drum and spread in a circumferential direction, and a support portion provided at the inner-surface front end of the coil winding drum, in that said magnetic pole tooth section whose outer-surface magnetic pole portion is positioned at the outer-surface side and whose coil winding drum is radially positioned is connected in dovetailed form to said connection housing positioned at the inner-surface side of said support portion, in that an engagement protrusion or engagement recess for dovetailed connection is provided on the inner surface of the support portion and an engagement protrusion or engagement recess for dovetailed connection is provided on the outer surface of the connection housing so as to fit into the engagement protrusion or engagement recess on the inner surface of the support portion, and in that the engagement protrusion or engagement recess for dovetailed connection, provided in the connection housing, is plastically deformed to remove the connection gap existing between the engagement protrusion and engagement recess that fit one another.

The engagement protrusion and the engagement recess can be easily fit into one another since a connection gas is present between both. Accordingly, the magnetic pole tooth section formed by each split core block can be easily assembled into the connection housing.

Since, after the assembly, a portion near the connection gap is plastically deformed to fill in the gap so that it is removed, the corresponding dovetailed connection is rigidly fastened and a rigid stator core is formed.

(2) The volume of the metallic material extruded by the plastic deformation exceeds the space volume of the connection gap, and the remainder of the stresses which have been released from the material by spring-back is left as a residual stress. Resultingly, adjacent magnetic pole teeth are pressed against each other and the dovetailed connections between the magnetic pole teeth and the connection housing are fastened rigidly.

(3) The upper end of the stator core forming the magnetic pole teeth is the plastically deformed portion of the connection housing, and the lower end is held by the stepped portion of the connection housing. The entire stator core is therefore supported in sandwiched form in its laminating direction by the connection housing, and for this reason, the fastening of the stator core in its laminating direction is improved.

The sandwiched supporting force in the laminating direction of the stator core can be enhanced by bestowing a stepped shape on the punch to be used for plastic deforming.

(4) Since the stator core forming the magnetic pole teeth can be assembled into highly accurate roundness, adjacent gaps are removed and both ends of each support portion of adjacent magnetic pole teeth are connected. Since this connection spans over the entire length in a radial direction, magnetic characteristics similar to those of a stator core which is formed into a single unit are maintained and the motor does not decrease in characteristics.

(5) Coils can be wound directly around split magnetic pole teeth. Therefore, these magnetic pole teeth, unlike the magnetic pole teeth formed on an integrated type of stator core, can have their shape designed according to the particular specifications of the motor.

(6) Since, unlike an integrated type of stator core, the stator core that has been split into segments enables coil winding without coil conductors being inserted from the narrow grooves between adjacent outer-surface magnetic pole teeth, the slots in the magnetic pole teeth can be coiled at a high space ratio. Also, since the slots can be coiled so as to be filled in, the thermal conductivity between coil conductors improves and increases in temperature can be suppressed.

(7) Since coils are not wound from the narrow grooves between adjacent outer-surface magnetic pole teeth, it is possible to use conductors large in diameter and thus to minimize increases in temperature by reducing coil resistance.

According to the present invention, it is possible to supply a stator core having the sufficient capability to withstand the repulsion of the motor torque and not deteriorating the performance of the motor significantly.

What is claimed is:

1. An electric motor comprising:
 a core section formed by an integrated set of a plurality of split core blocks radially arranged, each of the split core blocks having a magnetic pole portion, a body portion with winding coils, and a support portion, the magnetic pole portion being provided at an outer end of the body portion and spreading in a circumferential direction, the support portion being provided at an inner end of the body portion and having an engagement recess; and a metallic connection housing made of a material softer than said core section and having engagement protrusions at an outer surface thereof, said metallic connection housing being connected to the individual split core blocks in dovetailed form to create one connected core section;

wherein the engagement protrusions provided at the outer surface of said metallic connection housing are inserted into the corresponding engagement recesses provided on an inner surface of the support portion of the corresponding split core blocks in a form of dovetailed connections, each engagement protrusion of said metallic connection housing is plastically deformed by punching from the axial direction to remove a connection gap existing at each of the dovetailed connections and to press the adjacent support portions against each other.

2. An electric motor comprising:

a stator core formed by an integrated set of a plurality of magnetic pole tooth section radially arranged, each of the magnetic pole tooth section having a magnetic pole portion, a body portion with winding coils, and a support portion, the magnetic pole portion being provided at an outer end of the body portion and spreading in a circumferential direction, the support portion being provided at an inner end of the body portion and having an engagement recess; and a metallic connection housing made of a material softer than said magnetic pole tooth section and having engagement protrusions at an outer surface thereof, said metallic connection housing being connected to the individual magnetic tooth section in dovetailed form to create one connected stator core;

wherein the engagement protrusions provided at the outer surface of said metallic connection housing are inserted into the corresponding engagement recesses provided on an inner surface of the support portion of the corresponding magnetic pole tooth sections in a form of dovetailed connections, each engagement protrusion of said metallic connection housing is plastically deformed by punching from the axial direction to remove a connection gap existing at each of the dovetailed connections and to press the adjacent support portions against each other.

3. An electric motor as set forth in claim 1, wherein said connection housing is formed by cold forging, die-casting, or the like.

4. An electric motor as set forth in claim 1, wherein the connection gap is of a level at which the volume of the metallic material extruded by said plastic deformation is permissible.

5. An electric motor as set forth in claim 1, wherein said connection housing to which the dieing tool to be used for forming by means of said plastic deformation, such as a punch, is provided with pre-holing, pre-punching, or other preliminary machining, to ensure guidance for supporting the dieing tool.

6. An electric motor as set forth in claim 5, wherein said means of plastic deformation fastens split core blocks to said connection housing in the lateral laminating direction of said laminated steel plates.

7. An electric motor manufacturing method for forming a stator core by integrating a plurality of split core blocks having a magnetic pole portion, a body portion with winding coils, and a support portion, the magnetic pole portion being provided at an outer end of the body portion and spreading in a circumferential direction, the support portion being provided at an inner end of the body portion and having an engagement recess, the method comprising the acts of:

inserting engagement protrusions provided on an outer surface of a metallic connection housing into the corresponding engagement recesses provided on an inner surface of the support portion of the split core blocks to connect the individual split core blocks via dovetailed connections to the outer surface of the metallic connection housing;

deforming plastically the dovetailed connections at the metallic connection housing by punching the protrusions from the axial direction of the stator core to remove a connection gap existing at each of the dovetailed connections and to press adjacent support portions against each other for creating one connected stator core section.

8. An electric motor manufacturing method according to claim 7, wherein the metallic connection housing is made of a material softer than the core section.

* * * * *